US010937378B2

(12) United States Patent
Li et al.

(10) Patent No.: US 10,937,378 B2
(45) Date of Patent: Mar. 2, 2021

(54) DISPLAY PANEL AND DISPLAY METHOD

(71) Applicant: BOE Technology Group Co., Ltd., Beijing (CN)

(72) Inventors: Zhenzhen Li, Beijing (CN); Hui Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/759,830

(22) PCT Filed: Oct. 9, 2019

(86) PCT No.: PCT/CN2019/110120
§ 371 (c)(1),
(2) Date: Apr. 28, 2020

(87) PCT Pub. No.: WO2020/073918
PCT Pub. Date: Apr. 16, 2020

(65) Prior Publication Data

US 2020/0279536 A1 Sep. 3, 2020

(30) Foreign Application Priority Data

Oct. 12, 2018 (CN) ......................... 201811188604.8

(51) Int. Cl.
*G06F 1/00* (2006.01)
*G09G 3/36* (2006.01)
(Continued)

(52) U.S. Cl.
CPC ......... *G09G 3/3607* (2013.01); *G09G 3/2074* (2013.01); *G09G 3/3208* (2013.01);
(Continued)

(58) Field of Classification Search
None
See application file for complete search history.

(56) References Cited

U.S. PATENT DOCUMENTS

2013/0100179 A1 4/2013 Tomizawa et al.
2018/0130397 A1 5/2018 Zheng et al.
2018/0211088 A1 7/2018 Cho et al.

FOREIGN PATENT DOCUMENTS

CN 105096887 A 11/2015
CN 107945725 A 4/2018
(Continued)

OTHER PUBLICATIONS

Office Action dated Dec. 25, 2019 issued in corresponding Chinese Application No. 201811188604.8.

*Primary Examiner* — Michael A Faragalla
(74) *Attorney, Agent, or Firm* — Nath, Goldberg & Meyer; Joshua B. Goldberg

(57) ABSTRACT

The disclosure provides a display panel and a display method, the display panel includes multiple pixel arrangement units including a first pixel arrangement unit and a second pixel arrangement unit, at least a portion of the sub-pixel regions of the first pixel arrangement unit are vacant sub-pixel regions, each sub-pixel region of the second pixel arrangement unit has one sub-pixel, the display method includes: generating an original image composed of multiple virtual pixels, adjacent virtual sub-pixels in any two adjacent virtual pixels correspond to a single sub-pixel region; controlling color original components of the virtual pixels corresponding to the vacant sub-pixel regions to be 0, acquiring color original components of the virtual sub-pixels in remaining virtual pixels; calculating a display component of each sub-pixel according to the corresponding color original component of a same color in at least one virtual pixel corresponding thereto.

14 Claims, 4 Drawing Sheets

(51) Int. Cl.
*G09G 3/20* (2006.01)
*G09G 3/3208* (2016.01)

(52) U.S. Cl.
CPC ............... *G09G 2300/0452* (2013.01); *G09G 2320/0673* (2013.01)

(56) References Cited

FOREIGN PATENT DOCUMENTS

| | | | | | |
|---|---|---|---|---|---|
| CN | 108254963 | A | | 7/2018 | |
| CN | 108257514 | | * | 7/2018 | ............. G09F 9/302 |
| CN | 108257514 | A | | 7/2018 | |
| CN | 108364957 | A | | 8/2018 | |
| CN | 108366186 | | * | 8/2018 | .............. H04M 1/02 |
| CN | 108366186 | A | | 8/2018 | |
| CN | 108520888 | A | | 9/2018 | |
| CN | 109147644 | A | | 1/2019 | |
| JP | 2015-230411 | A | | 12/2015 | |

* cited by examiner

DISPLAY PANEL AND DISPLAY METHOD

CROSS-REFERENCE TO RELATED APPLICATIONS

The present application is a U.S. National Stage Application under 35 U.S.C. § 371 of International Patent Application No. PCT/CN2019/110120, filed on Oct. 9, 2019, which claims priority to Chinese patent application No. 201811188604.8 filed at the Chinese intellectual property office on Oct. 12, 2018, the disclosure of both which are incorporated herein by reference.

TECHNICAL FIELD

The disclosure relates to the field of display technology, and particularly relates to a display panel and a display method.

BACKGROUND

With the development of electronic products with a display function, such as mobile phones, increasing a screen-to-body ratio thereof has become a trend, however, necessary functional elements of the mobile phones such as front-facing cameras must become a big factor restricting the screen-to-body ratio to be increased. In order to solve such problem, an under-screen-camera solution where the camera is provided under the screen by reducing a pixel density and increasing light transmittance of a region of the screen is proposed, but due to the influence of the reduction of the pixel density and the sub-pixel rendering (SPR) algorithm, color shift would occur in a local transparent region.

SUMMARY

An embodiment of the present disclosure provides a display method of a display panel, the display panel includes a plurality of pixel arrangement units for arranging sub-pixels of respective colors, the pixel arrangement units include a first pixel arrangement unit and a second pixel arrangement unit which have a same arrangement of sub-pixel regions, at least a portion of the sub-pixel regions of the first pixel arrangement unit are vacant sub-pixel regions with no sub-pixel, and each of the sub-pixel regions of the second pixel arrangement unit is provided with one sub-pixel, the display method includes: generating an original image composed of a plurality of virtual pixels according to image information of an image to be displayed, wherein adjacent virtual sub-pixels in any two adjacent virtual pixels correspond to a single one of the sub-pixel regions of the display panel; controlling each of original components of respective colors of the virtual pixels corresponding to the vacant sub-pixel regions to be 0, and acquiring color original components of the virtual sub-pixels of respective colors in remaining ones of the virtual pixels; and calculating a display component of each sub-pixel according to the color original component of at least one virtual sub-pixel, with the same color as that of said each sub-pixel, in at least one virtual pixel corresponding to said each sub-pixel.

In some implementations, the display method further includes: calculating a gray scale of said each sub-pixel according to the display component of said each sub-pixel.

In some implementations, the display panel includes a liquid crystal display panel or an organic light emitting diode display panel.

In some implementations, the sub-pixels of respective colors include a red sub-pixel, a green sub-pixel, and a blue sub-pixel.

In some implementations, the first pixel arrangement unit includes 2×4 sub-pixel regions, the first three sub-pixel regions positioned in the first row are sequentially provided with a red sub-pixel, a green sub-pixel and a blue sub-pixel, the last sub-pixel region positioned in the first row and the sub-pixel regions positioned in the second row are all vacant sub-pixel regions;

the second pixel arrangement unit includes 2×4 sub-pixel regions, the sub-pixel regions in the first row are sequentially provided with a red sub-pixel, a green sub-pixel, a blue sub-pixel and a green sub-pixel, and the sub-pixel regions positioned in the second row are sequentially provided with a blue sub-pixel, a green sub-pixel, a red sub-pixel and a green sub-pixel.

In some implementations, each of the virtual pixels includes a red virtual sub-pixel, a green virtual sub-pixel and a blue virtual sub-pixel.

In some implementations, calculating the display component of said each sub-pixel according to the color original components of the virtual sub-pixels, with the same color as that of said each sub-pixel, in the virtual pixel corresponding to said each sub-pixel includes:

calculating the display component of said each sub-pixel according to the following formulas:

$$R = gamma\sqrt{\frac{r_1^{gamma} + r_2^{gamma}}{2}}$$

$$G = g1$$

$$B = gamma\sqrt{\frac{b_1^{gamma} + b_2^{gamma}}{2}}$$

where R represents the display component of the red sub-pixel; $r_1$ and $r_2$ represent red original components in two virtual pixels corresponding to the same red sub-pixel; G represents the display component of the green sub-pixel; $g_1$ represents the green original component of the virtual pixel corresponding to the green sub-pixel; B represents the display component of the blue sub-pixel; $b_1$ and $b_2$ represent blue original components of two virtual pixels corresponding to the same blue sub-pixel; and gamma is a fixed value.

An embodiment of the present disclosure provides a display panel, including a plurality of pixel arrangement units for arranging sub-pixels of respective colors, wherein the pixel arrangement units include a first pixel arrangement unit and a second pixel arrangement unit which have a same arrangement of sub-pixel regions, wherein at least a portion of the sub-pixel regions in the first pixel arrangement unit are vacant sub-pixel regions with no sub-pixel arranged therein, and each of the sub-pixel regions of the second pixel arrangement unit is provided with one sub-pixel therein, wherein the display panel further includes: an original image generating unit configured to generate an original image composed of a plurality of virtual pixels according to image information of an image to be displayed, wherein adjacent virtual sub-pixels in any two adjacent virtual pixels correspond to a single one of the sub-pixel regions of the display panel; an original component acquiring unit configured to control original components of respective colors of the virtual pixels corresponding to the vacant sub-pixel regions to be 0, and acquire original components of respective colors in remaining ones of the virtual pixels; and a calculating unit configured to calculate a display component of each sub-pixel according to the color original component of at least one virtual sub-pixel, with the same color as that of said each sub-pixel, in at least one virtual pixel corresponding to said each sub-pixel.

In some implementations, the calculating unit is further configured to calculate a gray scale of said each sub-pixel from the display component of said each sub-pixel.

In some implementations, the first pixel arrangement unit includes 2×4 sub-pixel regions, the first three sub-pixel regions positioned in the first row are sequentially provided with a red sub-pixel, a green sub-pixel and a blue sub-pixel, the last sub-pixel region positioned in the first row and the sub-pixel regions positioned in the second row are all vacant sub-pixel regions;

the second pixel arrangement unit includes 2×4 sub-pixel regions, the sub-pixel regions in the first row are sequentially provided with a red sub-pixel, a green sub-pixel, a blue sub-pixel and a green sub-pixel, and the sub-pixel regions positioned in the second row are sequentially provided with a blue sub-pixel, a green sub-pixel, a red sub-pixel and a green sub-pixel.

In some implementations, the calculating unit is configured to calculate the display component of said each sub-pixel according to the following formulas:

$$R = gamma\sqrt{\frac{r_1^{gamma} + r_2^{gamma}}{2}}$$

$$G = g1$$

$$B = gamma\sqrt{\frac{b_1^{gamma} + b_2^{gamma}}{2}}$$

where R represents the display component of the red sub-pixel; $r_1$ and $r_2$ represent red original components in two virtual pixels corresponding to the same red sub-pixel; g represents the display component of the green sub-pixel; $g_1$ represents the green original component of the virtual pixel corresponding to the green sub-pixel; b represents the display component of the blue sub-pixel; $b_1$ and $b_2$ represent blue original components of two virtual pixels corresponding to the same blue sub-pixel; and gamma is a fixed value.

DESCRIPTION OF EMBODIMENTS

Figure 1:
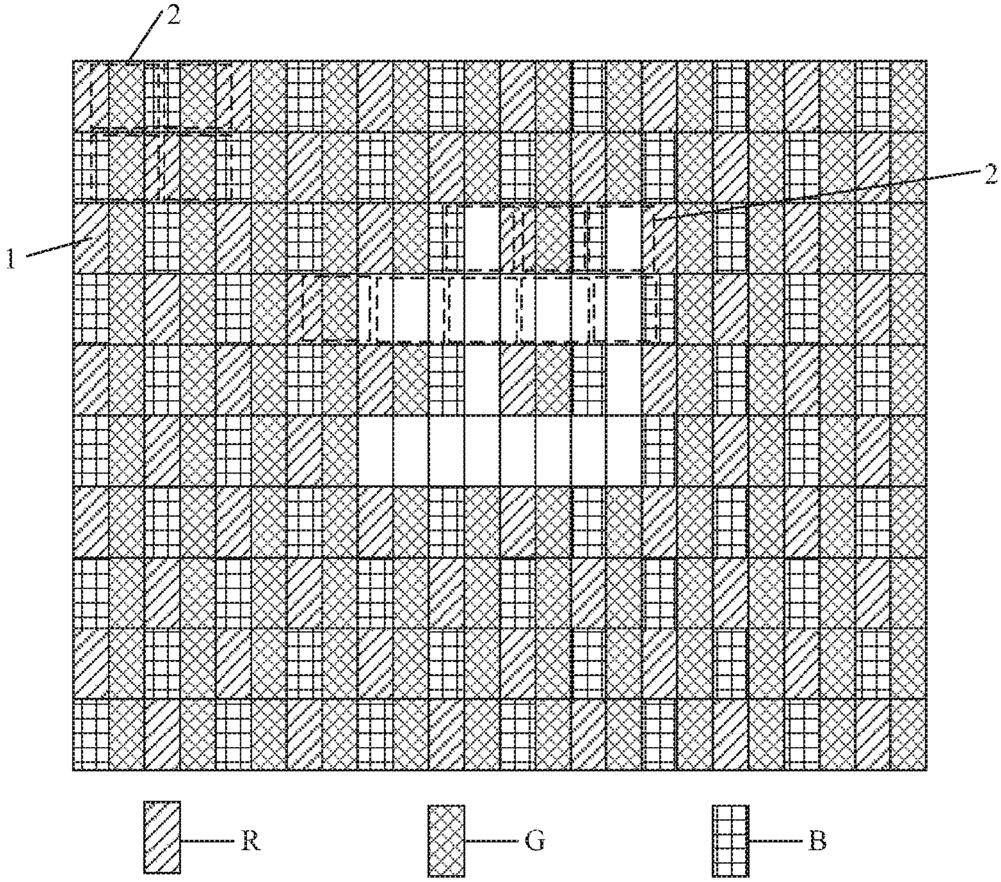
FIG. 1 is a schematic view of a pixel arrangement of a display panel according to an embodiment of the present disclosure.

In order that those skilled in the art will better understand the technical solutions of the present disclosure, the following detailed description is given with reference to the accompanying drawings and the specific embodiments.

Steps illustrated in the flowchart of the drawings may be performed in a computer system executing a set of computer-executable instructions. Also, although a logical order is shown in the flowchart, in some cases, the steps shown or described may be performed in an order different from that shown here.

Unless otherwise defined, technical or scientific terms used in the embodiments of the present disclosure should have the ordinary meaning as understood by any ordinary skill in the art to which the present disclosure belongs. The use of "first," "second," and similar terms in the embodiments of the present disclosure is not intended to indicate any order, quantity, or importance, but rather is used to distinguish one element from another. The word "comprising", "including", or the like indicates that an element or item preceding thereto contains the element or item listed after the word and its equivalent, without excluding other elements or items.

First, a structure of a display panel which displays through a display method in an embodiment of the present disclosure will be described. The display panel includes a plurality of pixel arrangement units; each of the pixel arrangement units includes a plurality of sub-pixel regions, and at least a portion of the sub-pixel regions are common sub-pixel regions; the common sub-pixel regions are used to provide with common sub-pixels therein, and the remaining sub-pixel regions are used to provide with general sub-pixels therein, and the physical structures of the common sub-pixels and the general sub-pixels are substantially the same, except that each of the common sub-pixels is used in multiple virtual pixels (which will be specifically described in the following embodiments) during displaying. In the display panel implementing the display method according to the embodiment of the present disclosure, the pixel arrangement units may include a first pixel arrangement unit and a second pixel arrangement unit, and the first pixel arrangement unit is different from the second pixel arrangement unit in that at least some of sub-pixel regions in the first pixel arrangement unit are provided with no sub-pixel therein, that is, the first pixel arrangement unit includes a vacant sub-pixel region. It should be understood that, in the embodiment of the present disclosure, it is only defined that at least a portion of the pixel regions in the first pixel arrangement unit are provided with no sub-pixel, and it is not defined whether the sub-pixel regions with no sub-pixel are common sub-pixel regions, that is, the first pixel arrangement unit may lack general sub-pixels, may also lack common sub-pixels, or lack general sub-pixels and common sub-pixels, and the display panel in any of the three cases may display by using the display method provided in the embodiment of the present disclosure, so as to avoid the problem of color shift of the display panel.

It should be noted that, when the first pixel arrangement unit of the display panel in this embodiment corresponds to a position for disposing a functional element such as a camera and a headphone, the first pixel arrangement units are generally provided at a central position of an end of the display panel, and the second pixel arrangement units are provided at other positions of the display panel. It should be understood that the positional relationship of the first pixel arrangement units and the second pixel arrangement units is not limited to the above-described one in practical applications, but the first pixel arrangement units and the second pixel arrangement units may be provided according to the position of the functional element in the display panel. Next, a structure of a display panel provided by an embodiment of the present disclosure will be described to facilitate understanding of a display method in an embodiment of the present disclosure.

As shown in FIG. 1, description is given by taking the display panel including red sub-pixels R, green sub-pixels G, and blue sub-pixels B, and the red sub-pixels R and the blue sub-pixels B being the common sub-pixels as an example. Certainly, it should be understood that, since the red sub-pixels R and blue sub-pixels B are the common sub-pixels, the sub-pixel regions where the red sub-pixels R and blue sub-pixels B are provided are the common sub-pixel regions, and the sub-pixel regions where the green sub-pixels G are provided are general sub-pixel regions.

Figure 2:
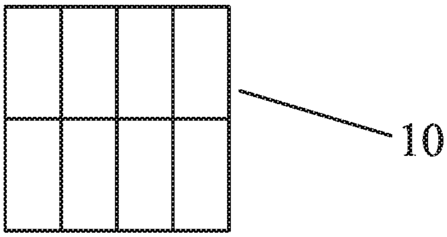
FIG. 2 is a schematic structural diagram of a pixel arrangement unit in a display panel according to an embodiment of the present disclosure.
Figure 3:
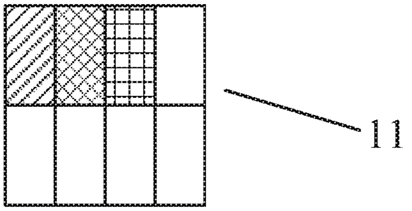
FIG. 3 is a schematic structural diagram of a first pixel arrangement unit in a display panel according to an embodiment of the present disclosure.
Figure 4:
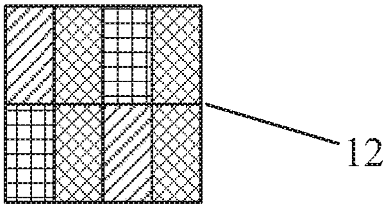
FIG. 4 is a schematic structural diagram of a second pixel arrangement unit in a display panel according to an embodiment of the present disclosure.

In an embodiment, the display panel includes a plurality of pixel arrangement units arranged in rows and columns. Each of the pixel arrangement units may include a plurality of sub-pixels in a same row, or may include a plurality of sub-pixels arranged in a matrix, and the following description will be given by taking an example in which each of the pixel arrangement units includes a plurality of sub-pixels arranged in a matrix. As shown in FIG. 2, each of the pixel arrangement units 10 includes 2 rows and 4 columns (2×4) of sub-pixel regions, here, the pixel arrangement unit having a vacant sub-pixel region is referred to as a first pixel arrangement unit 11, i.e., at least one of the sub-pixel regions of the first pixel arrangement unit 11 is provided with no sub-pixel, as shown in FIG. 3, and the pixel arrangement unit 10 having no vacant sub-pixel region is referred to as a second pixel arrangement unit 12, i.e., each of the sub-pixel regions of the second pixel arrangement unit 12 is provided with the sub-pixel, as shown in FIG. 4.

Sub-pixels 1, which are respectively a red sub-pixel R, a green sub-pixel G, and a blue sub-pixel B, are provided in the first three sub-pixel regions (three sub-pixel regions counted from left to right in FIG. 3) of the first row in the 2×4 sub-pixel regions of the first pixel arrangement unit 11, and no sub-pixel is provided in the other sub-pixel regions of the first pixel arrangement unit 11.

A red sub-pixel R, a green sub-pixel G, a blue sub-pixel B, and a green sub-pixel G are sequentially provided, from left to right, in the sub-pixel regions of the first row in the 2×4 sub-pixel regions of the second pixel arrangement unit 12; and a blue sub-pixel B, a green sub-pixel G, a red sub-pixel R and a green sub-pixel G are sequentially provided, from left to right, in the sub-pixel regions of the second row in the second pixel arrangement unit 12.

Since the red sub-pixels R and the blue sub-pixels B in the display panel described above are the common sub-pixels 1, the sub-pixels of the display panel may correspond to virtual pixels described later by means of a horizontal sub-pixel rendering algorithm. As shown in FIG. 1, a dashed box represents a virtual pixel 2 (not all virtual pixels 2 are indicated in FIG. 1); in a row direction, each red sub-pixel R is used for two adjacent virtual pixels 2, and similarly, each blue sub-pixel B is also used for two adjacent virtual pixels 2. In this case, a display component input to each red sub-pixel R is used as the red original components in two virtual pixels 2, and likewise, a display component input to each blue sub-pixel B is used as the blue original components in two virtual pixels 2.

The first pixel arrangement unit 11 has the same structure as the second pixel arrangement unit 12, and is different from the second pixel arrangement unit 12 in that a portion of the sub-pixel regions of the first pixel arrangement unit 11 are provided with no sub-pixel, because an element such as a camera is to be provided in these sub-pixel regions without sub-pixels. However, driving the sub-pixels 1 corresponding to the first pixel arrangement unit 11 in accordance with the method of driving the sub-pixels 1 corresponding to the second pixel arrangement unit 12 may cause the problem of color shift. Specifically, for example, taking the virtual pixel 2 corresponding to a position with no green sub-pixel G in the first row in each first pixel arrangement unit 11 as an example, since no green sub-pixel G is provided at the position, the green component of the virtual pixel 2 corresponding to the vacant sub-pixel region is 0, and at the same time, the red original component and the blue original component in the virtual pixel 2 are provided by the red sub-pixel R and the blue sub-pixel B in the sub-pixel regions adjacent to the vacant sub-pixel region, respectively, and without changing the display components of the red sub-pixel R and the blue sub-pixel B, the virtual pixel 2 corresponding to the vacant sub-pixel region still has the red original component and the blue original component, while since the green sub-pixel G is missing, the virtual pixel 2 does not have the green component, and each normal virtual pixel 2 has the red original component, the green original component, and the blue original component, thus the display of the virtual pixel 2 corresponding to the vacant sub-pixel region has a color shift.

Hereinafter, a display method provided by an embodiment of the present disclosure will be described by taking the above-mentioned display panel structure as an example, the display method can effectively solve the problem of color shift of display due to existing of the vacant sub-pixel regions in the display panel.

It should be noted that the display method provided in the present embodiment is not limited to be applied to the above-mentioned display panel structure, and the display method is applicable to various display panels having common sub-pixels 1 and vacant sub-pixel regions.

The display panel of the present embodiment may be, for example, an organic light-emitting diode (OLED) display panel, that is, each of the sub-pixels 1 includes a light-emitting unit (e.g., OLED), and light-emitting units of the sub-pixels 1 directly emit light with desired color and brightness; alternatively, the display panel may be a liquid crystal display panel, that is, each of the sub-pixels 1 includes a filter unit, and the light transmitted through the filter units of the sub-pixels 1 has desired color and brightness.

Figure 5:
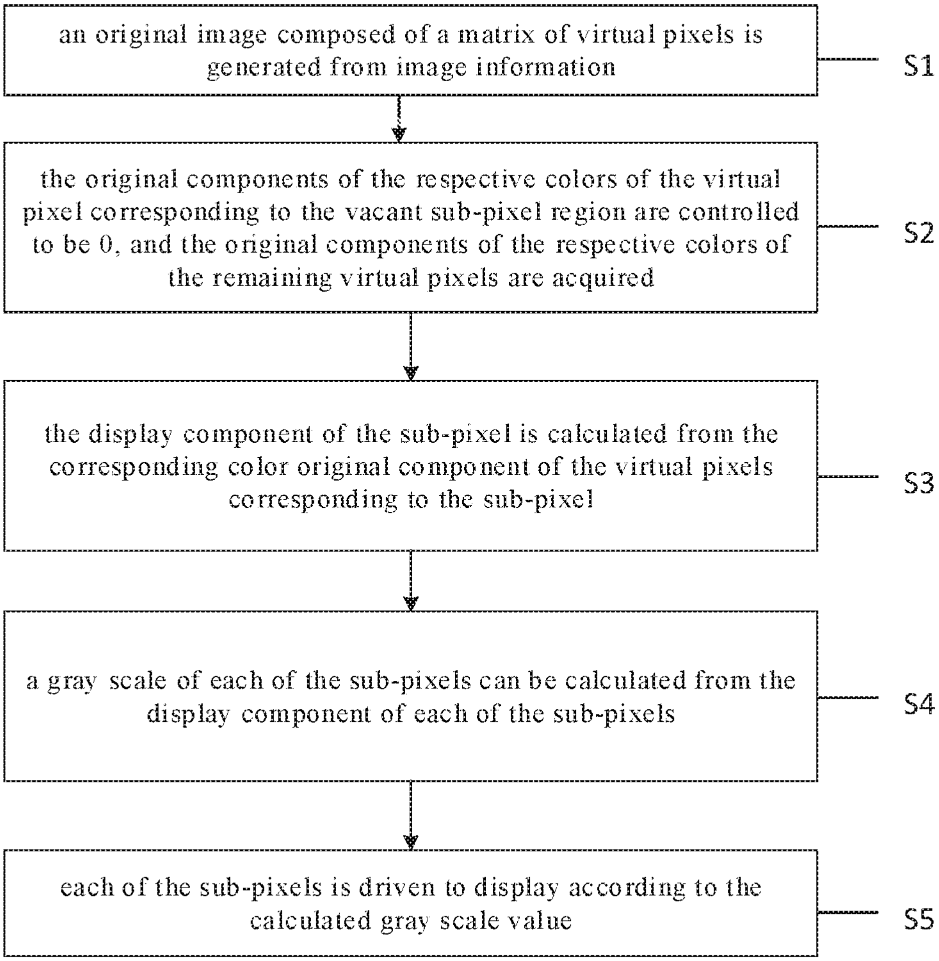
FIG. 5 is a flowchart of a display method of a display panel according to an embodiment of the present disclosure.

As shown in FIG. 5, an embodiment of the present disclosure provides a display method of a display panel, which specifically includes steps S1 to S5.

In step S1, an original image composed of a matrix of virtual pixels 2 is generated from image information.

Specifically, in this step, an original image generating unit in the display panel may be used to process the image information (i.e., content of an image to be displayed) obtained from a graphics card or the like to generate the original image, where the original image is composed of a matrix including a plurality of "dots (i.e., virtual pixels 2)", and each of the virtual pixels 2 includes virtual sub-pixels of three colors, that is, red, green, and blue, and original components of the virtual sub-pixels of the three colors indicate how many "amounts" of the three colors of red, green, and blue are respectively at the "dots". The virtual pixels 2 correspond to sub-pixel regions of the display panel as shown in FIG. 1, and adjacent virtual sub-pixels in any two adjacent virtual pixels correspond to a same sub-pixel of the display panel and have a same color, it can also be understood that any two adjacent virtual pixels share a same physical sub-pixel of the display panel.

The "component" in the above "original component" and subsequent "display component" refer to the "amount" of the color to be displayed at a corresponding position, which may be represented by "brightness", and the "component" being represented by "brightness" is taken as an example in this embodiment. Certainly, other measurement parameters, such as "gray scale", "saturation", etc., may be used as unit of the "component", as long as each "component" is capable of representing the "amount" to be displayed.

In step S2, the original components of the respective colors of the virtual pixel 2 corresponding to the vacant sub-pixel region are controlled to be 0, and the original components of the respective colors of the remaining virtual pixels 2 are acquired.

Specifically, in this step, an original component acquiring unit in the display panel controls the original components of the respective colors of the virtual pixels 2 corresponding to the vacant sub-pixel regions to be 0, and acquires the original components of the respective colors of the remaining virtual pixels 2.

The virtual pixel 2 corresponding to the position of the vacant sub-pixel region in the first row in the first pixel arrangement unit 11 will be described as an example. According to the arrangement rule of the sub-pixels 1 in the second pixel arrangement unit 12, a green sub-pixel G should be provided in the vacant sub-pixel region in the first row of the first pixel arrangement unit 11, and since no green sub-pixel G is provided at this position, the green original component of the virtual pixel 2 is 0, in this embodiment, the red original component and the blue original component of the virtual pixel 2 are also 0, therefore, when the display panel displays, the virtual pixel 2 displays as a black dot, and at this time, color shift would not occur. Certainly, in this step, the original components of the respective colors of the remaining virtual pixels 2 are still required to be acquired from the original image.

In step S3, the display component of the sub-pixel 1 is calculated from the corresponding color original components of the virtual pixels 2 corresponding to the sub-pixel 1.

Specifically, in this step, since the red, green and blue original components of each of the virtual pixels 2 have been acquired in step S2, a display component of each of the sub-pixels 1 can be calculated by a calculating unit in the display panel according to a horizontal rendering algorithm using the data acquired in step S2. Here, since the red sub-pixel R and the blue sub-pixel B in the present embodiment are common sub-pixels, the display component of each of the sub-pixels 1 can be calculated according to the following formulas:

$$R = gamma\sqrt{\frac{r_1^{gamma} + r_2^{gamma}}{2}}$$

$$G = g1$$

$$B = gamma\sqrt{\frac{b_1^{gamma} + b_2^{gamma}}{2}}$$

where, R represents the display component of the red sub-pixel; $r_1$ and $r_2$ represent the red original components of two virtual pixels 2 that share a same red sub-pixel; G represents the display component of the green sub-pixel; g1 represents the green original component of the virtual pixel 2 corresponding to the green sub-pixel; B represents the display component of the blue sub-pixel; $b_1$ and $b_2$ represent the blue original components of two virtual pixels 2 that share a same blue sub-pixel; the gamma is a fixed value, and usually set to be 2.2.

If the sub-pixel region corresponding to a certain green sub-pixel G in the display panel is a vacant sub-pixel region and the green original component of the virtual sub-pixel corresponding to the green sub-pixel G is g1, the green original component g1 of the virtual sub-pixel is controlled to be 0, and the red original component $r_1$ and the blue original component $b_1$ of the virtual pixel 2 to which the virtual sub-pixel belongs are both 0, so that the virtual pixel 2 displays as a black dot, and color shift can be avoided. Meanwhile, according to the above formulas, the display components input to the red, green and blue sub-pixels R, G and B can be calculated.

In step S4, preferably, when the original component, the display component, and the like are brightness, a gray scale of each of the sub-pixels 1 can be calculated from the display component of each of the sub-pixels 1.

Specifically, for a display panel with 256 gray scales, the gray scale can be calculated from the brightness by the following formula: A=(G/255) gamma×A255;

where, A is the calculated brightness (i.e., display component) of a certain sub-pixel 1, A255 is the brightness of the sub-pixel with a gray scale value of 255, and G is a gray scale value corresponding to the brightness A, which is an integer ranging from 0 to 255.

At this time, A, A255, gamma are known, so the gray scale value G can be obtained accordingly so as to be used in the subsequent steps. Certainly, it should be understood that if other modes such as 64 gray scales are adopted, the formula needs to be changed accordingly; alternatively, if the original component and the display component adopt other measurement units, the calculation method here is also different.

In step S5, each of the sub-pixels 1 is driven to display according to the calculated gray scale value.

That is, each of the sub-pixels 1 displays a corresponding gray scale, so as to obtain a corresponding image.

In the display method of the display panel provided by the present embodiment, the original components of respective colors of the virtual pixel 2 corresponding to the vacant pixel region in the display panel are controlled to be 0, so that the virtual pixel 2 displays as a black dot, that is, a 0 gray scale, thereby preventing the problem of color shift of the display panel when displaying.

Figure 6:
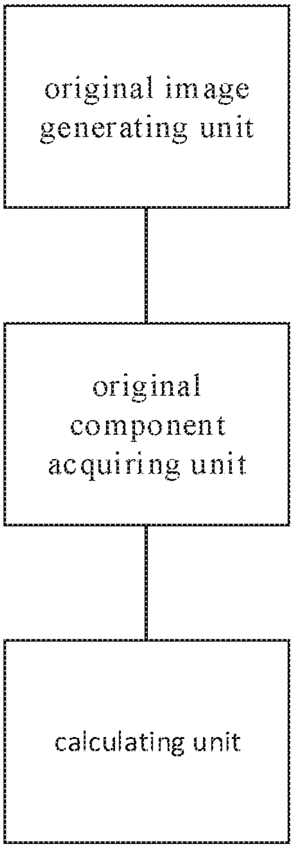
FIG. 6 is a schematic view of a display panel according to an embodiment of the present disclosure.

As shown in FIG. 6, an embodiment of the present disclosure provides a display panel that can display by using the display method in the foregoing embodiment. The arrangement of the pixels in the display panel may be the same as that described in the foregoing embodiment. Specifically, the display panel further includes an original image generating unit, an original component acquiring unit and a calculating unit.

The original image generating unit is configured to generate an original image corresponding to the virtual pixels 2 according to the image information of an image to be displayed.

Specifically, the original image generating unit is configured to process the image information (i.e., contents of an image to be displayed) obtained from a graphics card or the like to generate the original image, where the original image is composed of a matrix including a plurality of "dots (i.e., virtual pixels 2)", and each of the virtual pixels 2 has original components of three colors, that is, red, green, and blue for indicating how many "amounts" of the three colors of red, green, and blue are respectively at the "dots". The virtual pixels 2 correspond to the sub-pixel regions of the display panel as shown in FIG. 1, and adjacent virtual sub-pixels in adjacent two virtual pixels correspond to a same sub-pixel of the display panel and have a same color, it can also be understood that two adjacent virtual pixels share a same physical sub-pixel of the display panel.

The original component acquiring unit is configured to control original components of respective colors of the virtual pixels 2 corresponding to the vacant sub-pixel regions to be 0, and acquire original components of respective colors of the remaining virtual pixels 2.

Specifically, the virtual pixel 2 corresponding to the position of the vacant sub-pixel region in the first row of the first pixel arrangement unit 11 will be described as an example. According to the arrangement rule of the sub-pixels 1 in the second pixel arrangement unit 12, a green sub-pixel G should be provided in the vacant sub-pixel region in the first row of the first pixel arrangement unit 11, and since no green sub-pixel G is provided at this position, the green original component of the virtual pixel 2 is 0, in this embodiment, the red original component and the blue original component of the virtual pixel 2 are also 0, therefore, when the display panel displays, the virtual pixel 2 displays as a black dot, and at this time, color shift would not occur. Certainly, the original component acquiring unit also acquires the original components of respective colors of the remaining virtual pixels 2 from the original image.

The calculating unit is configured to calculate a display component of the sub-pixel 1 of the display panel according to the original components of the respective colors in the virtual pixel 2 corresponding to the sub-pixel 1.

In this embodiment, when the original components acquired by the original component acquiring unit, the display component calculated by the calculating unit, and the like are brightness, the calculating unit may further calculate a gray scale of each of the sub-pixels 1 according to the display component thereof.

Specifically, since the red sub-pixel R and the blue sub-pixel B in the present embodiment are common sub-pixels, the display component of each of the sub-pixels 1 can be calculated by the calculating unit according to the following formulas:

$$R = gamma\sqrt{\frac{r_1^{gamma} + r_2^{gamma}}{2}}$$

$$G = g1$$

$$B = gamma\sqrt{\frac{b_1^{gamma} + b_2^{gamma}}{2}}$$

where, R represents the display component of the red sub-pixel; $r_1$ and $r_2$ represent the red original components of two virtual pixels 2 that share a same red sub-pixel; G represents the display component of the green sub-pixel; g1 represents the green original component of the virtual pixel 2 corresponding to the green sub-pixel; B represents the display component of the blue sub-pixel; $b_1$ and $b_2$ represent the blue original components of two virtual pixels 2 that share a same blue sub-pixel; the gamma is a fixed value, and usually set to be 2.2.

If the sub-pixel region corresponding to a certain green sub-pixel G in the display panel is a vacant sub-pixel region and the green original component of the virtual sub-pixel corresponding to the green sub-pixel G is g1, the green original component g1 of the virtual sub-pixel is controlled to be 0, and the red original component $r_1$ and the blue original component $b_1$ of the virtual pixel 2 to which the virtual sub-pixel belongs are both 0, so that the virtual pixel 2 displays as a black dot, and color shift can be avoided. Meanwhile, according to the above formulas, the display components input to the red, green and blue sub-pixels R, G and B can be calculated.

Thereafter, the calculating unit may also calculate the gray scale of each of the sub-pixels 1 from the display component thereof. Specifically, for a display panel with 256 gray scales, the gray scale can be calculated from the brightness by the following formula: A=(G/255) gamma× A255;

where, A is the calculated brightness (i.e. display component) of a certain sub-pixel 1, A255 is the brightness of the sub-pixel with a gray scale value of 255, and G is a gray scale value corresponding to the brightness A, which is an integer ranging from 0 to 255.

At this time, A, A255, gamma are known, so the gray scale value G may be obtained accordingly so as to be used in the subsequent steps. Certainly, it should be understood that if another mode such as 64 gray scales is adopted, the formula needs to be changed accordingly; alternatively, if the original component and the display component adopt other measurement units, the calculation method here is also different.

Finally, each of the sub-pixels 1 may be driven to display according to the calculated gray scale value thereof.

That is, each of the sub-pixels 1 displays a corresponding gray scale, so as to obtain a corresponding image.

It should be noted here that, the structure of the display panel in this embodiment is not limited to the structure of the display panel in the foregoing embodiment, and may be various structures of the display panel having common sub-pixels 1 and vacant sub-pixel regions.

In some implementations, the display panel may be, for example, an organic light-emitting diode (OLED) display panel, that is, each of the sub-pixels 1 include a light-emitting unit (e.g., OLED), and light-emitting units of the sub-pixels 1 directly emit light with desired color and brightness; alternatively, the display panel may be a liquid crystal display panel, that is, each of the sub-pixels 1 include a filter unit, and the light transmitted through filter units of the sub-pixels 1 has desired color and brightness.

In the display panel provided by the present embodiment, the original component acquiring unit controls the original components of respective colors of the virtual pixel 2 corresponding to the vacant pixel region to be 0, so that the virtual pixel 2 displays a black dot (i.e., 0 gray scale) when displaying, thereby preventing the problem of color shift from occurring in the display panel when displaying.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. A display method of a display panel, wherein the display panel comprises a plurality of pixel arrangement units for arranging sub-pixels of respective colors, the pixel arrangement units comprise a first pixel arrangement unit and a second pixel arrangement unit which have a same arrangement of sub-pixel regions, at least a portion of the sub-pixel regions of the first pixel arrangement unit are vacant sub-pixel regions with no sub-pixel, and each of the sub-pixel regions of the second pixel arrangement unit is provided with one sub-pixel, the display method comprises:

generating an original image composed of a plurality of virtual pixels according to image information of an image to be displayed, wherein adjacent virtual sub-pixels in any two adjacent virtual pixels correspond to a single one of the sub-pixel regions of the display panel;

controlling each of original components of respective colors of the virtual pixels corresponding to the vacant sub-pixel regions to be 0, and acquiring color original components of the virtual sub-pixels of respective colors in remaining ones of the virtual pixels; and calculating a display component of each sub-pixel according to the color original component of at least one virtual sub-pixel, with the same color as that of said each sub-pixel, in at least one virtual pixel corresponding to said each sub-pixel.

2. The display method according to claim 1, further comprising: calculating a gray scale of said each sub-pixel according to the display component of said each sub-pixel.

3. The display method according to claim 1, wherein the display panel comprises a liquid crystal display panel or an organic light emitting diode display panel.

4. The display method according to claim 1, wherein the sub-pixels of respective colors include a red sub-pixel, a green sub-pixel, and a blue sub-pixel.

5. The display method according to claim 4, the first pixel arrangement unit includes 2×4 sub-pixel regions, the first three sub-pixel regions positioned in the first row are sequentially provided with a red sub-pixel, a green sub-pixel and a blue sub-pixel, the last sub-pixel region positioned in the first row and the sub-pixel regions positioned in the second row are all vacant sub-pixel regions;

the second pixel arrangement unit includes 2×4 sub-pixel regions, the sub-pixel regions in the first row are sequentially provided with a red sub-pixel, a green sub-pixel, a blue sub-pixel and a green sub-pixel, and the sub-pixel regions positioned in the second row are sequentially provided with a blue sub-pixel, a green sub-pixel, a red sub-pixel and a green sub-pixel.

6. The display method according to claim 5, wherein each of the virtual pixels comprises a red virtual sub-pixel, a green virtual sub-pixel and a blue virtual sub-pixel.

7. The display method according to claim 6, wherein calculating the display component of said each sub-pixel according to the color original components of the virtual sub-pixels, with the same color as that of said each sub-pixel, in the virtual pixel corresponding to said each sub-pixel comprises:

calculating the display component of said each sub-pixel according to the following formulas:

$$R = gamma\sqrt{\frac{r_1^{gamma} + r_2^{gamma}}{2}}$$

$$G = g1$$

$$B = gamma\sqrt{\frac{b_1^{gamma} + b_2^{gamma}}{2}}$$

where R represents the display component of the red sub-pixel; $r_1$ and $r_2$ represent red original components in two virtual pixels corresponding to the same red sub-pixel; G represents the display component of the green sub-pixel; $g_1$ represents the green original component of the virtual pixel corresponding to the green sub-pixel; B represents the display component of the blue sub-pixel; $b_1$ and $b_2$ represent blue original components of two virtual pixels corresponding to the same blue sub-pixel; and gamma is a fixed value.

8. A display panel, comprising a plurality of pixel arrangement units for arranging sub-pixels of respective colors, wherein the pixel arrangement units comprise a first pixel arrangement unit and a second pixel arrangement unit which have a same arrangement of sub-pixel regions, wherein at least a portion of the sub-pixel regions in the first pixel arrangement unit are vacant sub-pixel regions with no sub-pixel arranged therein, and each of the sub-pixel regions of the second pixel arrangement unit is provided with one sub-pixel therein, wherein the display panel further comprises:

an original image generating unit configured to generate an original image composed of a plurality of virtual pixels according to image information of an image to be displayed, wherein adjacent virtual sub-pixels in any two adjacent virtual pixels correspond to a single one of the sub-pixel regions of the display panel;

an original component acquiring unit configured to control original components of respective colors of the virtual pixels corresponding to the vacant sub-pixel regions to be 0, and acquire original components of the virtual sub-pixels of respective colors in remaining ones of the virtual pixels; and a calculating unit configured to calculate a display component of each sub-pixel according to the color original component of at least one virtual sub-pixel, with the same color as that of said each sub-pixel, in at least one virtual pixel corresponding to said each sub-pixel.

9. The display panel according to claim 8, wherein the calculating unit is further configured to calculate a gray scale of said each sub-pixel from the display component of said each sub-pixel.

10. The display panel of claim 8, wherein the display panel comprises a liquid crystal display panel or an organic light emitting diode display panel.

11. The display panel of claim 8, wherein the sub-pixels of respective colors comprise a red sub-pixel, a green sub-pixel and a blue sub-pixel.

12. The display panel of claim 11, wherein the first pixel arrangement unit includes 2×4 sub-pixel regions, the first three sub-pixel regions positioned in the first row are sequentially provided with a red sub-pixel, a green sub-pixel and a blue sub-pixel, the last sub-pixel region positioned in the first row and the sub-pixel regions positioned in the second row are all vacant sub-pixel regions;

the second pixel arrangement unit includes 2×4 sub-pixel regions, the sub-pixel regions in the first row are sequentially provided with a red sub-pixel, a green sub-pixel, a blue sub-pixel and a green sub-pixel, and the sub-pixel regions positioned in the second row are sequentially provided with a blue sub-pixel; a green sub-pixel, a red sub-pixel and a green sub-pixel.

13. The display panel of claim 12, wherein each of the virtual pixels comprising a red virtual sub-pixel, a green virtual sub-pixel and a virtual blue sub-pixel.

14. The display panel according to claim 13, wherein the calculating unit is configured to calculate the display component of said each sub-pixel according to the following formulas:

$$R = gamma\sqrt{\frac{r_1^{gamma} + r_2^{gamma}}{2}}$$

$$G = g1$$

$$B = gamma\sqrt{\frac{b_1^{gamma} + b_2^{gamma}}{2}}$$

where R represents the display component of the red sub-pixel; $r_1$ and $r_2$ represent red original components in two virtual pixels corresponding to the same red sub-pixel; g represents the display component of the green sub-pixel; $g_1$ represents the green original component of the virtual pixel corresponding to the green sub-pixel; b represents the display component of the blue sub-pixel; $b_1$ and $b_2$ represent blue original components of two virtual pixels corresponding to the same blue sub-pixel; and gamma is a fixed value.

* * * * *